July 20, 1954   MARTIN ØLGAARD THUNBO   2,684,219
AIRCRAFT WITH DETACHABLE CABIN
Filed Aug. 29, 1950   2 Sheets-Sheet 1
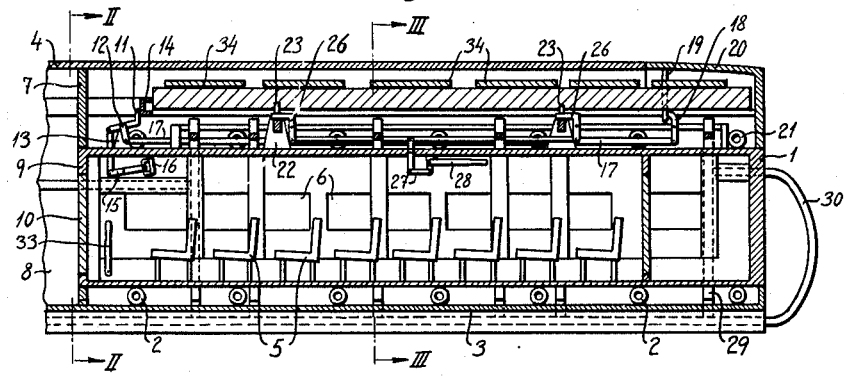
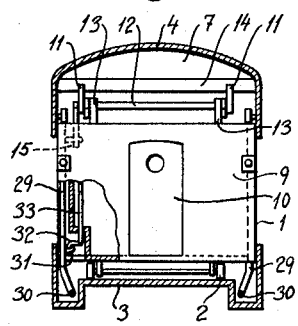
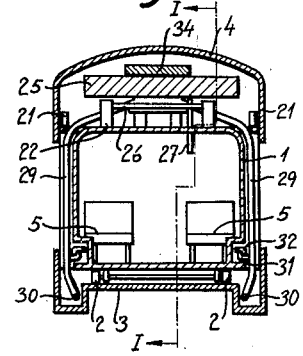
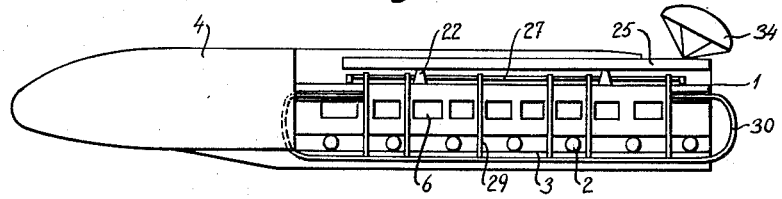
INVENTOR:
MARTIN OJGAARD THUNBO July 20, 1954    MARTIN ØLGAARD THUNBO    2,684,219
AIRCRAFT WITH DETACHABLE CABIN
Filed Aug. 29, 1950                 2 Sheets-Sheet 2
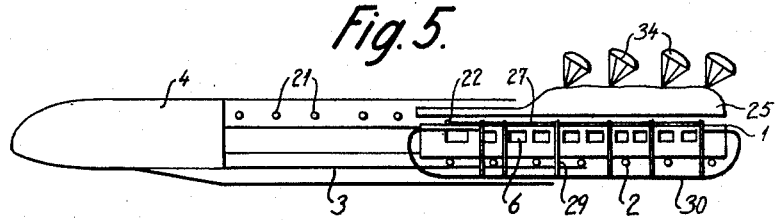
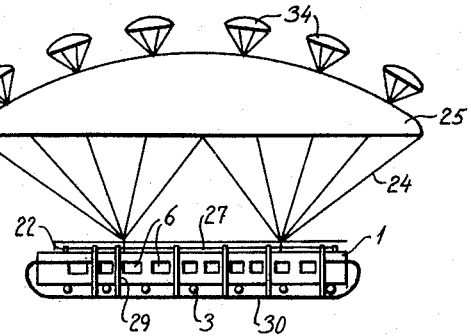
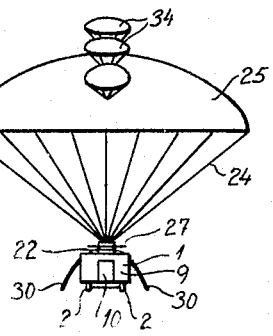
INVENTOR:
MARTIN OJAARD THUNBO

UNITED STATES PATENT OFFICE 2,684,219

AIRCRAFT WITH DETACHABLE CABIN

Martin Ølgaard Thunbo, Copenhagen, Denmark

Application August 29, 1950, Serial No. 182,056

1 Claim. (Cl. 244—140)

The present invention relates to improvements in an aircraft of the kind provided with a detachable cabin which has attached thereto one or several parachutes by means of which the cabin, after being detached from the aircraft, is supported in the air.

The main object of the invention is to provide an aircraft having a detachable cabin with improved means for supporting the detachable cabin within the aircraft fuselage, and to supply means for releasably connecting the cabin to the fuselage, which are simple in construction and effective in operation.

Other objects of the invention will be evident from the following description taken in conjunction with the accompanying drawing, in which Fig. 1 shows in vertical and longitudinal section the rear end of the fuselage of an aircraft with a detachable cabin, Fig. 2 is a cross section on line II—II in Fig. 1, and Fig. 3 is a cross section on line III—III in Fig. 1.

Fig. 4 shows in side elevation the aircraft preparatory to releasing the cabin.

Fig. 5 shows the aircraft in side elevation with the cabin partially displaced rearwardly out of the fuselage, Fig. 6 shows in side elevation the cabin after being released from the fuselage and suspended in its parachute, and Fig. 7 an end elevation of the cabin suspended in its parachute.

Referring to the drawing, 1 indicates the passenger cabin of an aircraft, and 2 indicates a number of small rollers mounted on the bottom of the cabin to run on lower part 3 of the aircraft fuselage 4. The cabin 1 is provided with seats 5 and windows 6. In the front end of the fuselage the cabin enters a partition 7 in the fuselage just rearwardly of the pilot's cockpit 8, and the front wall of the cabin 1 is provided with a watertight and air-tight door 10.

Normally the cabin 1 is fixed within the fuselage by means of two hooks 11 attached to a transverse shaft 12 which is journalled in brackets 13 arranged on the roof of the cabin, said hooks 11 engaging a transverse bar 14 rigidly attached within the upper part of the fuselage 4. By means of link members 15 the hooks 11 are connected partly to an operating handle 16 disposed within the cabin, and partly by means of other members 17 to hooks 18 disposed rearwardly. These latter hooks 18 engage annular members 19 on a cover 20, which is removably mounted on the upper part of the fuselage.

The fuselage 4 is provided with guide wheels 21 for the roof of the cabin 1, which on its roof has two brackets 22 provided with rings 23 fixed to cords 24 attached to a large folded parachute 25, which in any appropriate manner is disposed between the upper fuselage part and the cabin roof, when the cabin is in position within the fuselage. Normally rings 23 are attached to hooks 26, each of which is hinged to the brackets 22 and by means of a link member 27 is attached to a handle 28 inside the cabin.

In connection with each ring 23 there is attached a resilient rod 29 ending in a runner rail 30. Each rod 29 and 30 is provided with a hook 31, which may be caused to engage another hook 32 on a lever 33, see Figs. 1–3, extending inside the cabin 1, see Figs. 1–3. Normally the runner rails 30 are held against the cabin walls by means of hooks 31 and 32.

To the upper side of the large parachute are attached several small parachutes 34, which assist the unfolding of the large parachute.

In case of a catastrophe in connection with the aeroplane, the pilot may enter the cabin through the front door 10 and then close this door tightly. By means of the operating handle 16 the levers 15 and members 17 may be operated to release hooks 11 in relation to the transverse bar 14, and hooks 18 in relation to the annular members 19. By this the cover 20 will be released from the fuselage, and the rearmost small parachute 34 will be opened by the wind, see Fig. 4. The force imparted to this parachute will cause the detached cabin to move rearwardly so that other small parachutes 34 on the large parachute 25 are released one by one, see Fig. 5, and are opened by the air current. As soon as the large parachute is fully released the cabin will be leaving the fuselage, and is supported by the parachutes.

By turning the lever 33 its hooks 32 will be disengaged from the hooks 31 on the resilient rods 29, thus releasing these rods which owing to their resiliency swing outwardly to the position shown in Fig. 7, in which position they serve as supports for landing on firm ground.

In case the cabin falls into water, hooks 26 are released from rings 23 so that the parachutes 25 and 34 and runner rails 29 and 30 slide off the cabin, which thus will be able to float easily on the water until rescuers arrive.

I declare that what I claim is:

In an aircraft of the type described including a fuselage, a cabin arranged removably within said fuselage, parachute members for supporting the said cabin when it is removed from the fuselage during flight, means for detachably connecting said parachute means to the cabin, two exterior runner rails extending alongside the cabin for supporting the cabin when landed, a plurality of upwardly extending relatively spaced resilient rods attached to each runner rail, means for connecting the upper ends of each of said resilient rods detachably to the cabin, and releasing members operated from within the said cabin for smiultaneously detaching the said parachute members and the said runner rails from the cabin.

References Cited in the file of this patent

UNITED STATES PATENTS

| Number | Name | Date |
|---|---|---|
| 1,273,553 | Upson | July 23, 1918 |
| 1,445,293 | Calthrop | Feb. 13, 1923 |
| 1,760,061 | Horni | May 27, 1930 |
| 1,885,570 | Van Meter | Nov. 1, 1932 |
| 1,923,963 | Ayad | Aug. 22, 1933 |
| 2,077,910 | Thomson | Apr. 20, 1937 |
| 2,120,477 | Adams | June 14, 1938 |

FOREIGN PATENTS

| Number | Country | Date |
|---|---|---|
| 855,642 | France | Feb. 19, 1940 |